United States Patent [19]

Suzuki

[11] Patent Number: 4,737,358

[45] Date of Patent: Apr. 12, 1988

[54] METHODS FOR PRODUCING HIGH ALKALINE DRINKS

[76] Inventor: Katsumi Suzuki, 28-25 Kitakose Kose-cho, Kameoka Kyoto 621, Japan

[21] Appl. No.: 71,602

[22] Filed: Jul. 8, 1987

Related U.S. Application Data

[63] Continuation-in-part of Ser. No. 788,246, Oct. 17, 1985, abandoned.

[30] Foreign Application Priority Data

Oct. 18, 1984 [JP] Japan .................................. 59-219464

[51] Int. Cl.⁴ ......................... A61K 9/71; A61K 33/12; A61K 33/14

[52] U.S. Cl. ...................................... 424/40; 424/153; 424/154

[58] Field of Search ........................ 424/153, 154, 40

*Primary Examiner*—Stanley J. Friedman
*Attorney, Agent, or Firm*—Koda and Androlia

[57] ABSTRACT

A method for producing a highly alkaline drink, comprising the steps of forming a heat-proof clay mass, applying a muddy clay to the clay mass, allowing the mud-covered clay mass to dry, heating the muddy clay mass at a temperature of not lower than 750° C., placing charcoal or wood into contact with the heating clay mass so that at least part of the charcoal or wood is incinerated, submerging the heated clay mass in the water in a vessel before the heated clay mass cools down below 500° C., and removing the clay mass and floating matter from the water.

3 Claims, No Drawings

METHODS FOR PRODUCING HIGH ALKALINE DRINKS

This is a continuation-in-part of application Ser. No. 788,246, filed Oct. 17, 1985, now abandoned.

BACKGROUND OF THE INVENTION

1. Field of the Invention

The present invention relates to methods for producing health drinks from clay, and more particularly, to methods for producing highly alkaline drinks for improving and keeping health, wherein the material is obtained from clay.

2. Description of Prior Art

Generally various kinds of health foods and drink are becoming popular, and available in the market. In the case of an alkaline drink it is obtained from springs or wells as a natural water. Sometimes it is condensed at the producer's factory. However, the obtained alkaline drink has a low alkalinity. Unless people take it for a long time, it will not be effective to serve the purposes, such as health-keeping and beauty-keeping.

The inventor has been engaged in ceramic art for a long time, and familiarized himself with clay and ceramic. He has a vast knowledge of clay. Accidentally he has invented a method of producing a drinking water containing a high percentage of alkali with the use of clay, which is routine and common to him.

SUMMARY OF THE INVENTION

An object of the present invention is to provide methods for producing highly alkaline drinks at reduced costs, and with a simple facility.

Other objects and advantages of the present invention will become more apparent from the following description.

According to one aspect of the present invention, there is provided a method for producing a highly alkaline drink, the method comprising:
  forming a heat-proof clay mass;
  applying a mud to the mass;
  allowing the mud-covering mass to dry;
  heating the muddy mass at a temperature of not lower than 750° C.;
  placing the heating mass into contact with charcoal or wood so that at least part of it is incinerated;
  submerging the heated mass in water before it cools below 500° C.; and
  removing the mass and floating pieces from the water.

According to another aspect of the present invention, there is provided a method for producing highly alkaline drink, the method comprising:
  heating clay placed in contact with charcoal ar wood at a temperature of not lower than 750° C. so that at least part of the charcoal or wood is incinerated;
  submerging the heated clay in water before it cools below 500° C.; and
  removing solid pieces from the water.

DETAILED DESCRIPTION OF THE INVENTION

For the clay usable for the present invention, the clay for making pottery can be effectively used. In general the clay for this use is divided into two types: a primary clay and a secondary clay. The primary clay is obtained near the country rock, and the secondary clay is obtained from deposits occurring naturally as a result of flowing primary clay, away from the country rock. The secondary clay often contains organic matter, such as carbonized plants, and ferric oxide, because of the latter content the clay looking red. This accounts for its name of red clay. There is another type of clay, commonly called gairome clay, which is an intermediate between the primary clay and the secondary clay. The above-mentioned three kinds of clay can be selectively used for the present invention. Table (1) shows the chemical compositions of clay in general use for pottery.

In this specification the clay includes a primary clay, such as kaolin, a secondary clay, such as red clay, and intermediates therebetween. It has been found out that red clay is more effective than any other.

Clay can be obtained from place to place in the country, but the qualitative analysis has ascertained that red clay contains not only iron oxides but also mica, montomorillonite, and other similar adsorptive minerals. In particular, the primary and secondary clays utilized in the present invention may be one of the various clays found in and around Kyoto, Japan; however, any clay from any location may be utilized from any source so long as it meets the criteria described above and is not contaminated with toxic substances such as herbicides, insecticides, radioactive material, cyan, mercury, lead, arsenic, etc.

The heat-proof clay mass mentioned above is obtained by molding kibushi clay (containing clay containing carbonized plant), porcelian or ceramic in such shapes as to allow heat to pass therethrough when the masses are piled in a stack in the furnace, and to have a vast surfacial area and stability when they are overlaid.

The clay mass is heated at a temperature of not lower than 750° C. This is because if it is heated below 750° C., the resulting ash content will fail to be attached to the surface of clay. A preferred range is 800° C. to 1000° C. As a result of the repeated experiments this range has been selected, because when the mass is heated at 800° C. or more, the ash content is well attached to the clay in a short time. However, it is impractical to heat it at more than 1000° C. when the furnace is a small, handy type. The fuel efficiency will be reduced.

In addition, charcoal and wooden pieces are often referred to in this specification. The charcoal and the wooden piece are obtained from an oak tree, a cherry tree, a cypress tree, kunugi (a kind of oak) or any other kinds of deciduous trees suitable for producing charcoal. However, the source of the charcoal and wooden pieces is not limited thereto. The ashes mentioned in this specification are obtained by burning trees, and they exclude the ashes obtained by burning grasses or straws.

The invention will be more particularly described by way of example.

EXAMPLE (1)

Clay used for pottery was molded in a cylinder having an outside diameter of 110 cm, an inside diameter of 80 cm and a height of 50 cm, and allowed to dry for 2 days. Commercial red clay was made muddy by adding water at the ratio of 1.9 kg of water to 1.0 kg of clay. The cylindrical clay mass was wholly covered with the muddy red clay by means of a brush. The mud film had a thickness of about 1 mm. The mud-covered clay mass was allowed to dry in the room for 24 hours. In this way 100 pieces of masses were produced. The mud-covered clay masses were piled in a stack in an electric furnace, and heated for about 5 hours. When their surfacial temperatures reached about 850° C., 5 kg of pine charcoal was placed on contact with the individual clay masses. After about 10 minutes when the charcoal became red, 50 pieces were taken out one after another, and put into water in a vessel. The water had had a room temperature, and its amount was 15 liters. When all of them were put, the temperature of the water reached 100° C., that is, the boiling point. The other 50 pieces were put in another vessel, and left for about an hour as they were. When the temperature of the water lowered to 40° C. to 50° C., the clay masses were picked up from the vessel. The water in the vessel contained grey floating matter, and looked milky-white. The water was roughly filtered by means of cotton cloth, and then filtered by means of cotton cloth, and then filtered by means of a nylon mat. The filters were highly alkaline.

The filtrate was clearly transparent with no color or visible floating matter through a transparent container.

EXAMPLE (2)

Instead of the red clay in Example (1) white clay was used, which had the chemical composition shown in Table (5). The other conditions were the same as those in Example (1).

The filtrate had no visible floating matter, and the taste was not different from that of the water of Example (1).

EXAMPLE (3)

Instead of the pine charcoal in Example (1), 5 kg of a pine piece was used, and the heating temperature was raised to about 900° C. Ten minutes after the wood pieces are burnt to ashes, the clay masses were taken out of the furnace. The other conditions were the same as those for Example (1).

The obtained water was clear enough to observe no floating matter therein, and tasted as pure water does.

EXAMPLE (4)

Charcoal was pulverized to grain-sizes ranging from 3 mm to 5 mm, and the same red clay as the one used in Example 1 was combined with the pulverized charcoal at the ratio of 10 (clay) to 2 (charcoal) by weight. The mixture was heated at about 800° C. The other conditions were the same as those for Example (1).

The obtained water was clear enough to observe no visible floating matter therein, such as ashes, and tasted as pure water does.

Table (3) shows the pH value, ash content, and iodide ions of the water obtained from each of the Examples (1) to (4). The analysis of the ash content was conducted by vaporizing the specimen on a tray so as to solidify thereon, heating it at 600° C. in an electric furnace for three hours, and measuring the weight of the residue. The quantity of the ash content after filtration was analyzed through the measurement of the ash content remaining on a filter paper with pore diameter of 7 microns.

Table (4) shows the results of qualitative analysis with respect to the metal contents for the water obtained from each example. The metal content has been identified by luminous analyses.

The water obtained under the present invention has no color (transparent), odor or taste. As shown in Tables (3), (4) and (5), the water exhibits a high alkalinity with high pH values, and contains an ash content in addition to small portions of Na, Si and Mg. It has been also ascertained that very small portions of Fe and Al are respectively contained.

Table (5) shows the results of quantitative analysis of Na, Cl, Si and Mg contained in the water produced under the present invention.

Table (1) shows the chemical composition of clay generally known as "clay for pottery", which data was obtained by analyzed four specimens.

In contrast to Table (1), Table (2) shows the chemical composition of the clay used for carrying out the present invention, which data was obtained by analyzing two specimens.

TABLE (1)

| Chemical Composition | Spc. (1) % | Spc. (2) % | Spc. (3) % | Spc. (4) % |
|---|---|---|---|---|
| Silica ($SiO_2$) | 47.8 | 49.5 | 48.1 | 50.0 |
| Alumina ($Al_2O_3$) | 36.1 | 34.4 | 34.8 | 33.9 |
| Ferric Oxide ($Fe_2O_3$) | 0.4 | 1.3 | 1.0 | 1.3 |
| Calcium Oxide (CaO) | 1.8 | 0.5 | 0.5 | 0.5 |
| Magnesia (MgO) | 1.0 | 0.3 | 0.4 | 0.1 |
| Potassium Oxide ($K_2O$) | 0.5 | 0.6 | 0.9 | 0.8 |
| Sodium Oxide ($Na_2O$) | 0.2 | 0.6 | 0.2 | 0.2 |
| Weight Loss (1 g loss) | 12.4 | 12.9 | 14.3 | 16.1 |

[Note]
'Spc.' stands for speciman. Spc. (1) was obtained from a primary clay (kaolin). Spc.(2) was obtained from an intermediate (commonly called gairome clay). Spc. (3) and Spc. (4) were obtained from a secondary clay (kibushi clay).

TABLE (2)

| Chemical Composition | Spc. (1) % | Spc. (2) % |
|---|---|---|
| Silica ($SiO_2$) | 60.37 | 77.53 |
| Alumina ($Al_2O_3$) | 18.76 | 13.82 |
| Titan ($TiO_2$) | 0.90 | 0.34 |
| Ferric Oxide ($Fe_2O_3$) | 9.60 | 0.60 |
| Calcium Oxide (CaO) | 0.34 | 0.23 |
| Magnesia (MgO) | 0.73 | 0.32 |
| Potassium Oxide ($K_2O$) | 1.75 | 2.33 |
| Sodium Oxide ($Na_2O$) | 0.16 | 0.20 |
| Weight Loss (1 g loss) | 7.34 | 4.36 |

[(Note]
'Spc.' stands for speciman, and Spc.(1) is the red clay which was used in Examples (1), (3) and (4). Spc. (2) is white clay which was used in Example (2).

TABLE (3)

| Items Specimens | pH | Ash Content (unfiltered) (mg/l) | Ash Content (filtered) (mg/l) | Iodide Ions (mg/l) |
|---|---|---|---|---|
| Spc. 1 | 10.6 | 81 | 78 | 0.5 or below |
| Spc. 2 | 8.2 | 75 | 70 | 0.5 or below |
| Spc. 3 | 10.1 | 81 | 75 | 0.5 or below |
| Spc. 4 | 9.5 | 76 | 68 | 0.5 or below |

[Note]
The Spc. stands for a specimen, and the Spcs. (1) to (4) were obtained from Examples (1) to (4), respectively.

TABLE (4)

|  | Fe | Al | Ca | Cu | Na | K | Ba | Si | Mg | B |
|---|---|---|---|---|---|---|---|---|---|---|
| Spc. 1 | tr | ++ | +++ | − | + | − | − | + | + | − |
| Spc. 2 | tr | tr | +++ | − | + | − | − | + | + | − |
| Spc. 3 | tr | tr | +++ | − | ++ | − | − | ++ | + | − |

TABLE (4)-continued

| | Fe | Al | Ca | Cu | Na | K | Ba | Si | Mg | B |
|---|---|---|---|---|---|---|---|---|---|---|
| Spc. 4 | tr | + | +++ | − | + | − | − | + | + | − |

[Note]
The Spc. stands for a specimen, and the Spcs. (1) to (4) were obtained from Examples (1) to (4), respectively.
The sign − shows that no element was identified, the sign tr shows that a trace of presence was observed, and the sign + shows that a small amount was detected. The sign ++ shows that the detected amount was more than that of the sign +. Likewise, the sign +++ shows that the detected amount was more than that of the sign ++. The absolute amount of each sign +, ++ and +++ is different with each element.

TABLE (5)

| Contents | Spc. (1) | Spc. (2) | Spc. (3) | Spc. (4) |
|---|---|---|---|---|
| Na (mg/l) | 5.9 | 5.9 | 5.4 | 5.8 |
| Ca (mg/l) | 16 | 11 | 14 | 11 |
| Si (mg/l) | 7.2 | 5.9 | 6.8 | 6.6 |
| Mg (mg/l) | 95 | 79 | 83 | 59 |

[Note]
Spc. stands for a specimen. and Spcs. (1) to (4) were obtained from Examples (1) to (4), respectively.

I claim:

1. A method for producing a highly alkaline drink, the method comprising:

molding a heat-proof clay mass from clay selected from the group consisting of primary clay, secondary clay and intermediates therebetween;

applying a muddy clay to the clay mass to form a muddy clay mass;

allowing the muddy clay mass to dry;

heating the dry muddy clay mass until a temperature of the surface of the dry muddy clay mass is not more than 750° C.;

contacting charcoal or wood with the heated surface of the muddy clay mass so that at least part of the charcoal or wood is incinerated;

submerging the heated muddy clay mass in water contained in a vessel, before the heated mudd clay mass cools down below 500° C.;

removing the heated muddy clay mass from the water when the temperature of the water cools to between 40° C. and 50° C.; and filtering the water.

2. A method as defined in claim 1, wherein the clay is red clay.

3. A method as defined in claim 1, wherein the surface of the muddy clay mass is heated to a temperature range from 800° C. to 1000° C.

* * * * *